(No Model.)
D. BRAZIER.
STOVE FIRE POT AND STOKER.
No. 491,333. Patented Feb. 7, 1893.
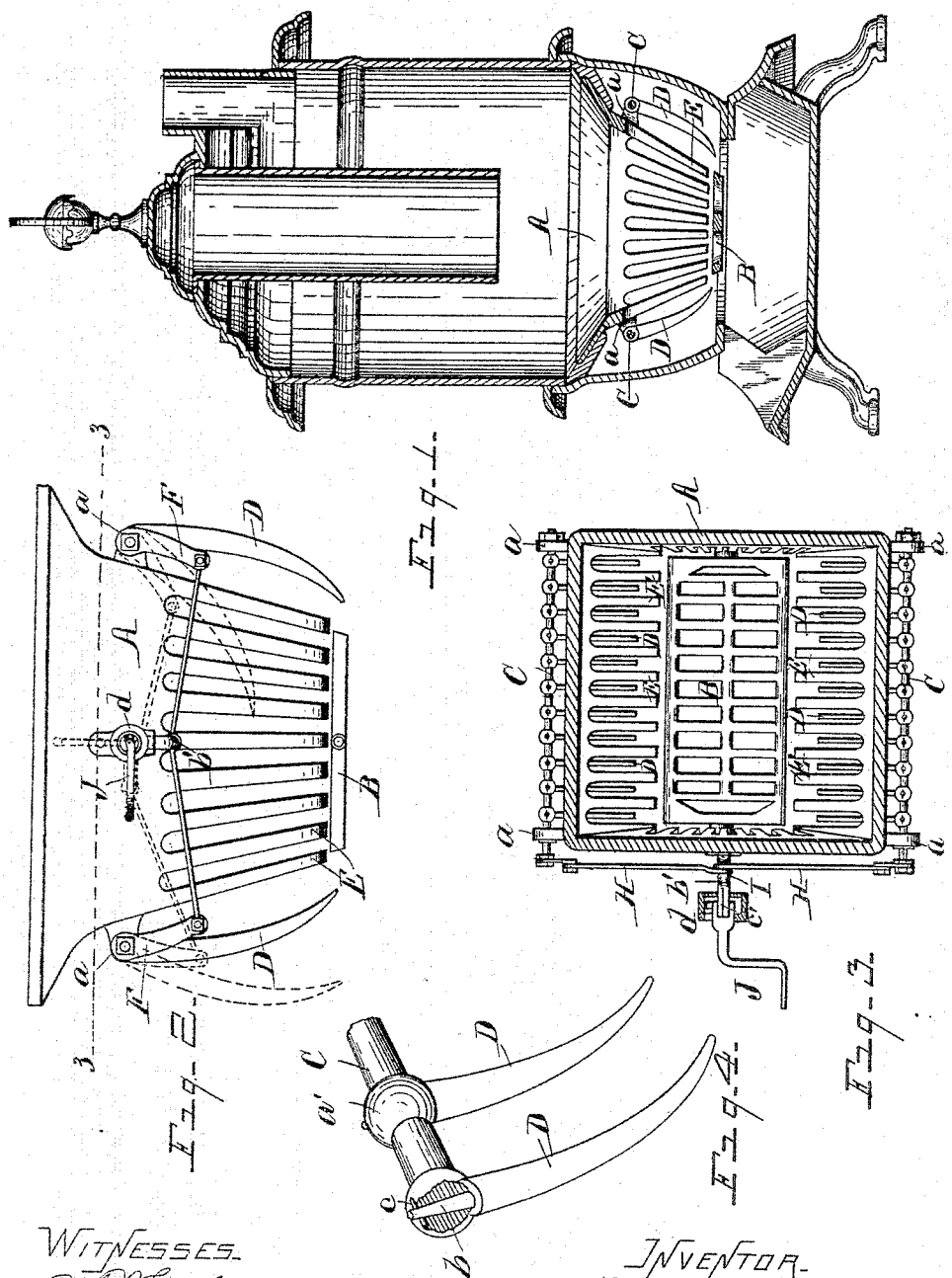

UNITED STATES PATENT OFFICE.

DANIEL BRAZIER, OF DETROIT, MICHIGAN, ASSIGNOR OF ONE-HALF TO WILLIAM H. CARSON.

STOVE FIRE-POT AND STOKER.

SPECIFICATION forming part of Letters Patent No. 491,333, dated February 7, 1893.

Application filed April 14, 1892. Serial No. 429,083. (No model.)

*To all whom it may concern:*

Be it known that I, DANIEL BRAZIER, a citizen of the United States, residing at Detroit, in the county of Wayne and State of Michigan, have invented certain new and useful Improvements in Stove Fire-Pots and Stokers; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to an improved fire-pot, and ash removing and stoking device; and consists in a certain construction and arrangement of parts, as hereinafter fully set forth, the essential features of which being pointed out particularly in the claims.

The object of the invention is to provide means for effecting a concentrated fire, and perfect combustion, and a further provision whereby the ashes may be completely discharged from the fire-pot and grate, and the fire thoroughly stoked without the waste of fuel, and obviating the dust and dirt usually incident to such an operation. This object is attained by the construction illustrated in the accompanying drawings, in which:—

Figure 1 is a central vertical section through a stove with my improved features. Fig. 2 is an enlarged side elevation of the fire-pot, with the stirring or stoking tines mounted thereon. Fig. 3 is horizontal section through the fire-pot on dotted line 3—3 of Fig. 2. Fig. 4 is an enlarged perspective of the stoking tines and the manner of attaching them on the shaft.

Referring to the letters of reference, A indicates the fire-pot, which is shown in the drawings as annular at the top, and rectangular at the base, the sides of which converge forming a reduced opening at the bottom, in which is located a removable or dumping grate B. This formation of the pot is adapted to enter a round or square coal-stove as commonly made. And by means of this particular feature of construction of pot, the coal as it feeds downward to supply the fire, on reaching the point where the annular form of the pot merges into the angular form, will bridge over forming an arch across the pot that prevents the weight of coal from crowding downward and choking up the center of the pot, and by this accumulation forcing the air draft outward around the edge of the pot through the thinner portion of the coal, causing uneven combustion and leaving the center of the pot dead. The arch formed across my improved pot, by the burning coal, obviates this difficulty and affords a free burning undermining fire.

Located on the opposite sides of the fire-pot, and journaled in lugs or brackets $a$ formed thereon, are the shafts C, on which is mounted a series of tines D, that are so arranged as to register with the openings between the depending fingers E of the fire-pot. Said tines are secured to the shaft C by providing them with a tapering tenon $b$ as shown in Fig. 4, that is received in a corresponding aperture in said shaft, said tenon passing slightly through the aperture receives the cross-pin $c$ which retains it therein. The shaft being provided with this manner of attaching the tines to the shaft, enables them to be readily and independently removed, in case a tine should become broken and it was desired to replace it.

F indicates crank-arms mounted on the end of the shaft C, which are coupled by the connecting rods H, with the crank J of the shaft I that is journaled in suitable supports, and provided with a squared end $c'$, that extends into a socket $d$ secured in the frame of the stove, and is adapted to receive the detachable crank J by means of which the shaft I is revolved. The revolution of the shaft I through its crank $b$, imparts a reciprocating motion to the connecting rods H which being coupled to the respective crank arms F of the shafts C, causes said shafts to rock or oscillate, whereby the free ends of the tines D mounted on said shafts are alternately swung into and withdrawn from the fire-pot, through the openings between the fingers E as clearly shown by dotted lines in Fig. 2. The arrangement being such, that, as the tines on one side are entering the pot, those on the opposite side are withdrawing, thereby thoroughly stoking or stirring the fire, which loosens and separates the ashes from the coal, and discharges the ashes through the grate leaving the coal free therefrom, in which condition a higher degree of combustion is maintained, effecting a more perfect consumption of fuel. It will be seen that, by this means of stirring the fire and removing the ashes, none of the unconsumed coal is discharged from the fire pot, as the openings in the grate and pot are not enlarged by this process of "shaking," but on the contrary said openings are partially closed as the tines enter the fire-pot between the fingers thereof. It will also be seen that, in the use of this improved device, the scattering of the ashes about the stove when "poking" the fire, is obviated, as the use of an ordinary poker is dispensed with, therefore requiring no lower doors or poke holes around the base of the stove. When the stoking tines are in repose they depend outside of the fire-pot, as shown in Fig. 2, in which position they are not subjected to the heat of the fire.

The grate B is pivotally mounted at its center, or made entirely removable to provide for emptying the fire-pot when desired.

This improved device may be attached to any of the ordinary coal-stoves in use, and is adaptable to cook-stoves, grates and furnaces.

Having thus fully set forth my invention what I claim as new and desire to secure by Letters Patent, is;—

1. A fire-pot having an annular rim and upper body portion, and an angular lower body portion or base, the walls of said pot converging, and all of the opposed angular portions thereof being provided with depending fingers.

2. The combination of the fire-pot having a series of depending fingers, the rock-shaft journaled outside of, but adjacent to said pot, the series of tines mounted on said shaft so as to depend vertically therefrom and normally hang remote from the fire-pot, said tines being so arranged as to be reciprocated in the arc of a circle by the actuation of said shaft, and alternately projected through and withdrawn from said pot through the side thereof between said depending fingers.

3. The combination of the fire-pot having a series of openings in opposite sides thereof, the rock shafts the series of tines mounted on said shafts and arranged opposite said openings, and mechanism for actuating said shafts to cause said tines to alternately swing into and withdraw from said openings on opposite sides of the fire-pot, substantially as specified.

4. The combination of the fire-pot having openings on opposite sides thereof, the series of opposite tines mounted on rock shafts and arranged opposite said openings, the arms connected to said rock shafts, the revoluble crank-shaft, the connecting-rods coupling said crank-shaft to the respective arms on said rock-shafts, whereby by the rotation of said crank shaft, the rock shafts are simultaneously oscillated to alternately swing the opposed series of tines, into and out of the fire-pot, through said openings, substantially as specified.

In testimony whereof I affix signature in presence of two witnesses.

DANIEL BRAZIER.

Witnesses:
E. S. WHEELER,
WM. H. CARSON.